Sept. 30, 1941. J. W. THROCKMORTON ET AL 2,257,206
METHOD AND APPARATUS FOR CONVERTING HYDROCARBON GASES TO LIQUID
Filed Jan. 2, 1937
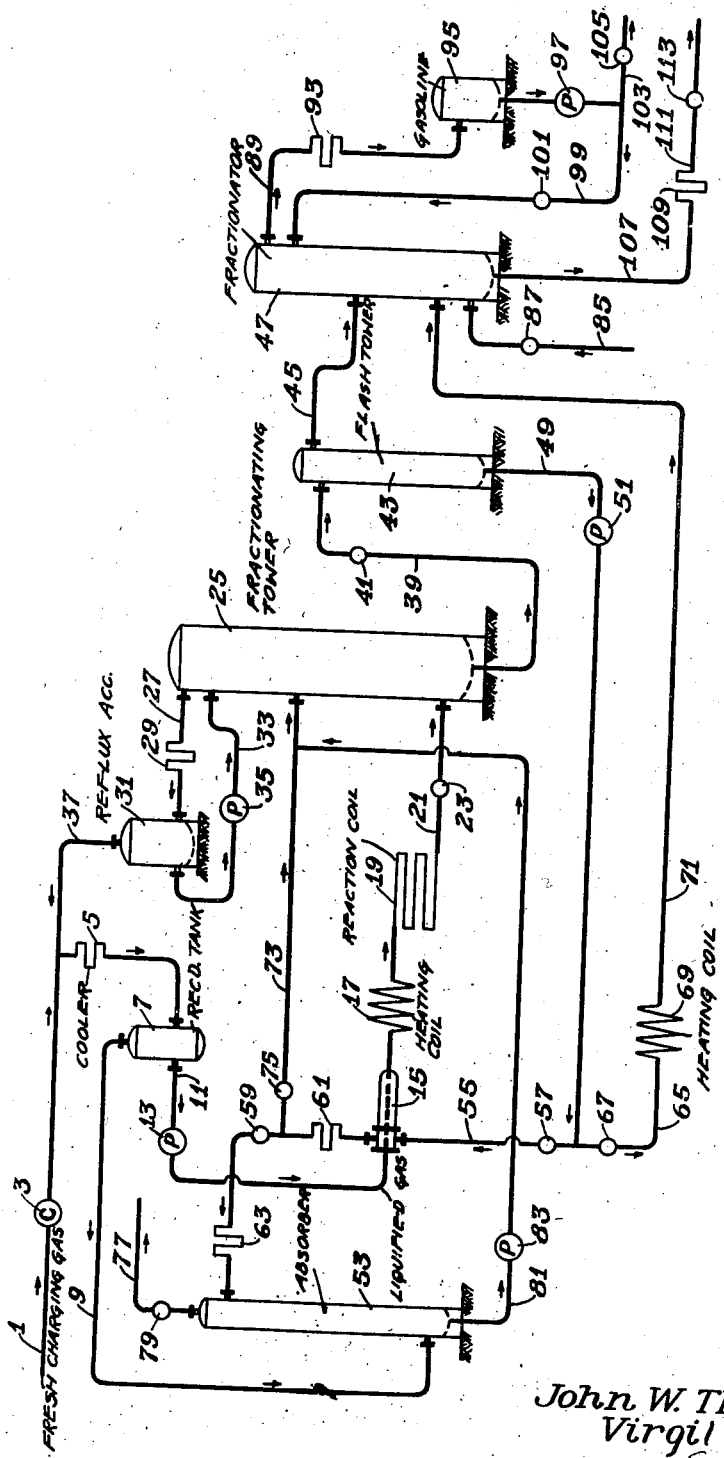
INVENTOR
John W. Throckmorton
Virgil D. Drummond
Edward H. Lang
ATTORNEY Patented Sept. 30, 1941

2,257,206

UNITED STATES PATENT OFFICE 2,257,206

METHOD AND APPARATUS FOR CONVERTING HYDROCARBON GASES TO LIQUID

John W. Throckmorton, New York, N. Y., and Virgil D. Drummond, Westfield, N. J., assignors to The Pure Oil Company, Chicago, Ill., a corporation of Ohio Application January 2, 1937, Serial No. 118,820

5 Claims. (Cl. 196—10)

This invention relates to method and apparatus for converting hydrocarbon gases into valuable liquid hydrocarbons, and is more particularly concerned with method and apparatus for converting at moderately elevated temperatures and pressures, higher molecular weight hydrocarbon gases into liquid hydrocarbons rich in aromatics.

In accordance with our process, gas from any suitable source, such as natural gas or gas from an oil cracking process, may be compressed sufficiently to liquefy most of the heavier gas constituents and the gaseous fraction separated from the liquid fraction. The liquid fraction may then be pumped through suitable heating and reaction zones wherein conditions of temperature and pressure suitable for converting the gases to liquid products are maintained. The reaction products may be separated into normally gaseous and normally liquid fractions and the normally gaseous fractions recycled for admixture with the fresh gases charged to the process. The portion of the fresh and recycled gas not liquefied may be contacted with a heavy fraction of liquid polymers produced in the process in order to absorb the heavier gaseous constituents remaining in the gaseous fraction. The rich polymer oil may then be charged to a fractionating tower and allowed to accumulate as a pool in the bottom thereof. The hot reaction products leaving the reaction zone may be charged directly into the pool of polymer liquid collected in the bottom of the fractionating tower in order to lower the temperature of the reaction products below conversion temperature and to strip the liquid polymer of its absorbed gases. The liquids from the fractionating tower may be flashed in order to separate the lower boiling fractions containing the gasoline constituents from the higher boiling fraction. The higher boiling fraction after suitable cooling may be in whole or in part recycled to an absorber for contact with the uncondensed gases and in whole or in part recycled directly to the fractionating tower. The overhead from the flashing operation may be suitably fractionated to recover a gasoline fraction and a heavier fraction similar to gas oil.

One of the objects of our invention is to provide method and apparatus for efficiently converting hydrocarbon gases into valuable liquid hydrocarbons.

Another object of our invention is to provide an economical process for producing hydrocarbons useful as motor fuel or in the industrial arts, from hydrocarbon gases.

Another object of our invention is to provide a novel method for quenching the reaction products in order to quickly lower the temperature below the conversion temperature.

Another object of our invention is to provide a novel method for fractionating the reaction products and for utilizing the heavier reaction products.

The invention may be more fully understood from a consideration of the following detailed description in conjunction with the accompanying drawing, of which the single feature is a diagrammatic flow sheet of apparatus suitable for carrying out the invention.

Referring to the drawing, the numeral 1 indicates a line through which fresh gases, such as natural gas, gas from various types of oil cracking processes either liquid, liquid-vapor or vapor phase, or coke oven gases are charged by means of compressor 3 through a cooler 5 where the gases are cooled to a temperature of approximately 80° F. The gases may be compressed to approximately 235 pounds per square inch before passing through the cooler. From the cooler 5 the gases, a portion of which have been condensed to liquids, pass into the feed tank 7 from which the uncondensed fraction of the gas is withdrawn through a line 9 and the liquid fraction is withdrawn through the line 11 by means of the pump 13. The liquid gases are charged by means of the pump 13 under a pressure of approximately 300 to 400 pounds per square inch, preferably about 350 pounds per square inch, to a heat exchanger 15 wherein the gases may be heated to a temperature of approximately 425° F. by indirect interchange with heavy polymers formed in the process. The temperature to which the gases are heated in the exchanger 15 is sufficient to entirely vaporize them.

From the heat exchanger 15 the gas may be passed through the heating coil 17, which may be located in any suitable furnace. The gases leave the heating coil 17 at a temperature of approximately 1150 to 1200° F., and at a pressure of approximately 250 to 300 pounds per square inch, preferably about 275 pounds per square inch, and then pass through a reaction coil 19 in order to provide sufficient time element to enable conversion of the gases to liquid to take place. The rate of passage of the gases through the heating coil 17 should be such that the net result of the reaction taking place therein is endothermic. The heated gases may enter the reaction coil 19 at a temperature of approximately 1100 to 1150° F. under pressure of approximately 275 pounds per square inch, and may leave the reaction coil at a temperature of approximately 1075 to 1125° F. The net result of the reaction in the coil 19 is exothermic. The time of residence of the gases in the reaction coil may be approximately 5–50 seconds. The coil 19 is preferably of larger cross sectional area than the heating coil 17 in order to provide a reduction in velocity of gases and increased time of reaction. The reaction coil is preferably enclosed in an insulated chamber having damper-controlled inlets and outlets to provide for circulation of air or other cooling medium over the coils for the purpose of controlling the rate at which the exothermic heat is removed from the reaction coil. From the coil 19 the reaction products pass through the line 21 controlled by valve 23 to the primary fractionating tower 25. The pressure in the primary fractionating tower will be approximately 240 pounds, and is preferably the same as the pressure at the outlet of the reaction coil.

The primary fractionator 25 is maintained at a top temperature of 150° F. and a bottom temperature of 500° F. Under the conditions of temperature and pressure maintained in this fractionator substantially only those hydrocarbons which are gaseous under normal atmospheric temperatures and pressures such as butane, butylene, propane, propylene, ethylene, ethane, methane and hydrogen, will remain uncondensed and pass over the top of the fractionating tower to line 27 through condenser 29 into the reflux accumulator 31. The gases entering the accumulator 31 will have a temperature of approximately 125° F. and a pressure of approximately 235 pounds per square inch. That portion of the gas which is liquefied is recycled from the reflux accumulator 31 through line 33 by means of pump 35 back to the top of the primary fractionator 25 as reflux. The uncondensed gases leave the top of the accumulator 31 through line 37 and join the fresh feed line 1.

The polymer condensate collected in the bottom of the tower 25 passes therefrom through line 39 controlled by valve 41 into the upper portion of the flash tower 43. The pressure on the condensate is reduced by means of the valve 41 to approximately 125 to 175 pounds per square inch. In the flash tower the lighter ends of the polymer condensate, including the gasoline fractions as well as some fractions heavier than gasoline, pass overhead through the line 45 into the middle portion of the secondary fractionator 47. The unvaporized portion of the condensate may be withdrawn from the bottom of the flash tower 43 through the line 49 by means of pump 51 and charged either to the absorber 53 through line 55 controlled by valves 57 and 59, exchanger 15, coolers 61 and 63; or may be charged through line 65 controlled by valve 67, heating coil 69 and line 71, back to the lower portion of the secondary fractionator 47; or may be charged through line 55, exchanger 15, cooler 61 and line 73 controlled by valve 75, into the middle portion of the primary fractionator 25. The particular place to which the heavier polymer condensate is recycled will depend upon the amount of condensate, the rate at which the unit is being charged with fresh gas, and the type of gas being charged. The heating coil 69 may be located in a cooler portion of the same furnace in which coil 17 is located and the products passing through coil 69 may be heated sufficiently to maintain the bottom of the secondary fractionator at a temperature of approximately 400 to 425° F.

The heavy condensate recycled from the flash tower 43 may be split and a portion charged to the absorber, another portion charged to the primary fractionator, and another portion recycled to the secondary fractionator; or the heavy condensate may be split into two streams and charged to any two of the three towers mentioned; or the entire condensate may be charged to any single tower, depending on the requirements at the particular time. The absorber is maintained under a pressure of approximately 230 pounds per square inch and a temperature of approximately 80 to 100° F. The combined fresh feed and recycled gaseous fractions pass into the lower portion of the absorber 53 through the line 9 and pass counter current to the cooled heavy polymer condensate which is charged into the upper portion of the absorber. In the absorber, the $C_3$ and $C_4$ hydrocarbons are absorbed in the heavy polymer condensate and the residual unabsorbed gases consisting chiefly of hydrogen, methane, ethane and ethylene with small amounts of $C_3$ and $C_4$ hydrocarbons, are vented from the top of the absorber through the line 77 controlled by valve 79.

The rich polymer condensate is withdrawn from the bottom of the absorber 53 through line 81 by means of pump 83 and charged to the middle portion of the fractionator 25. The primary fractionator may be equipped with suitable bubble plates in order to obtain efficient fractionation. The contact of the rich absorber liquid in the primary fractionator with the hot reaction vapors strips the condensate of its content of absorbed gases. The condensate is collected in the bottom of the primary fractionator 25 in a pool and maintained at a level above the point of connection of the line 21 to the tower. As previously stated, the bottom of the primary fractionator is maintained at a temperature of approximately 500° F. and thereby the pool of liquid maintained in the bottom thereof acts as a quenching medium to quickly chill the hot reaction products entering from the reaction coil 19 to a temperature below conversion temperature.

Steam may be introduced into the bottom of the secondary fractionator 47 through line 85 controlled by valve 87 in order to vaporize any gasoline boiling constitutents that may condense therein. The gasoline boiling hydrocarbons are taken overhead from the tower 47 through line 89, condenser 93 and collected in the accumulator 95. A portion of the gasoline condensate from the accumulator 95 may be recycled by means of pump 97 and line 99 controlled by valve 101 to the top of the secondary fractionator 47 as reflux. The remainder of the condensate may be pumped from the accumulator through line 103 controlled by valve 105 to storage or to a suitable treating plant.

Those fractions which collect in the bottom of the secondary fractionator 47 and which are heavier than the desired gasoline distillate are withdrawn through line 107, cooling coil 109, line 111, controlled by valve 113 to storage.

As an example of the yields that can be obtained by this process, a gas consisting by weight of 42.1% of $C_3$ hydrocarbons (chiefly propane) and 55.46% of $C_4$ hydrocarbons (chiefly butane) with 2.44% of inert constituents, was charged through the treating and reaction coil under the conditions of temperature and pressure hereinbefore specified, yielding 52% by weight of the residue gas and 48% by weight of crude distillate. The composition of the residue gas was as follows:

| Constituents | Mol. |
| --- | --- |
|  | Per cent |
| Inert | 15.05 |
| CH$_4$ | 48.20 |
| C$_2$H$_4$ | 8.93 |
| C$_2$H$_6$ | 20.25 |
| C$_3$H$_6$ | 2.17 |
| C$_3$H$_8$ | 5.11 |
| C$_4$H$_8$ | 0.05 |
| C$_4$H$_{10}$ | 0.24 |

The polymer distillate had the following properties:

Gravity A. P. I. _____ 28.0
Percent over at 400° F. ____ 80.
Octane number 400° E. P.
  distillate _____ 90+ (motor method)

It will be seen, therefore, that we have provided method and apparatus for producing a high yield of gasoline and other valuable liquid hydrocarbons from hydrocarbon gases and in addition have succeeded in producing a gasoline having an exceptionally high octane rating.

By fractionating the gases prior to charging them to the system, those hydrocarbons which are inactive under the conditions of temperature and pressure used, namely—nitrogen, hydrogen, methane and ethane, and those hydrocarbons whose activity is too great under the conditions employed, namely—ethylene, are eliminated so that the charge consists substantially only of those hydrocarbons which react to the desired extent. By eliminating the light gases it is possible to charge the gas in the liquid state thereby increasing the capacity of the plant enormously and also avoiding the high cost of compression. Moreover, by eliminating ethylene from the gases, over-polymerization and consequent formation of tar and coke is avoided, thereby making possible the use of the heavy polymers as absorber oil and reflux.

It should be understood that our invention is not limited to the specific temperatures and pressures recited herein, the particular conditions given being illustrative of the conditions which we consider most preferable for carrying out the process.

We claim as our invention:

1. The method of converting gaseous hydrocarbons into liquid hydrocarbons which comprises separating fresh gaseous hydrocarbons into a liquid fraction composed chiefly of C$_3$ and C$_4$ hydrocarbons and a gaseous fraction composed chiefly of lower molecular weight hydrocarbons together with non-hydrocarbon gases, passing the liquid fraction through heating and reaction zones under suitable conditions of time, pressure and temperature to bring about conversion of a substantial portion of the gases to liquids, immediately thereafter and without substantial reduction in pressure, passing the reaction products into a pool composed substantially entirely of relatively cool condensate maintained in a fractionating tower whereby the reaction products are cooled below conversion temperature, flashing the liquid from said pool to vaporize hydrocarbons boiling within the gasoline range, condensing the latter, cooling the unvaporized liquid from the flashing step, charging said gaseous fractions to an absorption zone together with a portion of the cooled unvaporized liquid from the flashing step, charging rich liquid from the absorption zone to said fractionating tower, recycling another portion of said cooled unvaporized liquid directly to the fractionating tower at a point above said pool, and commingling the unvaporized portions of the recycled liquid with said pool.

2. The method of converting hydrocarbon gases into liquid hydrocarbons which comprises separating the gases into a liquid fraction composed substantially of C$_3$ and C$_4$ hydrocarbons and a gaseous fraction composed chiefly of lower molecular weight hydrocarbons and non-hydrocarbon gases, charging the liquid fraction to heating and reaction zones maintained under suitable conditions of temperature, pressure and time to convert a substantial portion of the gases to liquid products, immediately and without substantial reduction in pressure, passing the reaction products into a pool of relatively cool condensate in order to chill the reaction products below conversion temperature, fractionating the resulting vapors in a fractionating zone in order to condense substantially all hydrocarbons which are liquid at normal atmospheric conditions and collecting the resulting condensate in said pool, flashing condensate from said pool in order to vaporize those hydrocarbons boiling within the gasoline range, and condensing the resulting vapors, cooling the unvaporized condensate, recycling a portion of the cooled unvaporized condensate to an absorption tower under pressure, recycling another portion of the cooled unvaporized condensate directly to said fractionating zone, withdrawing gases from the top of said fractionating zone and commingling them with fresh gases charged to the system prior to separation of said gases into liquid and gaseous fractions, charging the last mentioned gases fraction under pressure to said absorption tower in contact with condensate charged thereto, and charging the rich condensate from the absorption tower to said fractionating zone.

3. The method of converting gaseous hydrocarbons into liquids which comprises separating the gases in a gas fractionating step into a liquid fraction comprising C$_3$ and C$_4$ hydrocarbons and a gaseous fraction comprising lower molecular weight hydrocarbon and non-hydrocarbon gases, subjecting the liquid fraction to conditions of time, temperature, and pressure suitable for converting said gases to liquids, quenching the conversion products in a pool of relatively cool condensate to a temperature below conversion and without substantial reduction in pressure, fractionating the quenched conversion products into a liquid fraction containing substantially all the hydrocarbons liquid under normal atmospheric conditions and a gaseous fraction containing substantially only those hydrocarbons gaseous under normal atmospheric temperatures and recycling said last mentioned gaseous fraction to the gas fractionating step, flashing the liquid fraction in order to vaporize those fractions boiling within the gasoline range, cooling the unvaporized liquid from the flashing step, recycling a portion of the cooled unvaporized liquid directly to the fractionating zone, charging another portion of said cooled unvaporized condensate to an absorption zone, contacting the cooled liquid under pressure with said first mentioned gaseous fraction in said absorption zone in order to absorb the C$_3$ and C$_4$ hydrocarbons therein, and charging the rich liquid to the fractionating zone.

4. Apparatus for converting hydrocarbon gases to liquids comprising a reservoir, an inlet line to said reservoir, a compressor in said line, means for withdrawing gases from said reservoir and means for withdrawing liquid therefrom, a heating means connected to said liquid withdrawal line, a pump in said line, a reaction means connected to said heating means, a fractionating means connected to said reaction means, means for withdrawing gases from the upper portion of said fractionating means, means for withdrawing liquid from the lower portion thereof, a flash chamber connected to the last mentioned liquid withdrawal means, means for taking off and condensing vapors from the upper part of said flash chamber, means for withdrawing liquid from the lower part of said flash chamber, an absorber tower, means for charging liquid from said flash chamber to the upper portion of said absorber tower, means to charge liquid from said flash chamber to said fractionating means, means to charge gases from said reservoir to the lower portion of said absorber tower, means for eliminating the unabsorbed gases from the absorber tower, and means for charging rich oil from the absorber tower to said fractionating means.

5. Apparatus in accordance with claim 4 including a second fractionating means, means for charging vapors from said flash chamber to said second fractionating means, means for heating liquid withdrawn from said flash chamber, means for charging the heated liquid to said second fractionating means, means for withdrawing liquid from said second fractionating means and means to withdraw and condense vapors from said second fractionating means.

JOHN W. THROCKMORTON.
VIRGIL D. DRUMMOND.